(12) United States Patent
Klinger et al.

(10) Patent No.: US 10,889,326 B2
(45) Date of Patent: Jan. 12, 2021

(54) CRASH ASSEMBLY

(71) Applicant: AUDI AG, Ingolstadt (DE)

(72) Inventors: Thomas Klinger, Ingolstadt (DE);
Walter Schmidt, Rennertshofen (DE)

(73) Assignee: AUDI AG, Ingolstadt (DE)

( * ) Notice: Subject to any disclaimer, the term of this patent is extended or adjusted under 35 U.S.C. 154(b) by 60 days.

(21) Appl. No.: 16/329,485

(22) PCT Filed: Jul. 28, 2017

(86) PCT No.: PCT/EP2017/069110
§ 371 (c)(1),
(2) Date: Feb. 28, 2019

(87) PCT Pub. No.: WO2018/050341
PCT Pub. Date: Mar. 22, 2018

(65) Prior Publication Data
US 2019/0225271 A1    Jul. 25, 2019

(30) Foreign Application Priority Data

Sep. 14, 2016    (DE) ........................ 10 2016 217 475

(51) Int. Cl.
*B62D 21/15* (2006.01)
*B62D 9/00* (2006.01)
*B60G 7/00* (2006.01)
*B62D 7/22* (2006.01)

(52) U.S. Cl.
CPC ............... *B62D 21/15* (2013.01); *B62D 9/00* (2013.01); *B60G 7/00* (2013.01); *B60G 2206/016* (2013.01); *B62D 7/228* (2013.01)

(58) Field of Classification Search
CPC .......... B62D 21/15; B62D 9/00; B62D 7/228; B60G 7/00; B60G 2206/016
See application file for complete search history.

(56) References Cited

U.S. PATENT DOCUMENTS

| | | | |
|---|---|---|---|
| 1,251,639 A | 1/1918 | Chadwick | |
| 1,472,345 A | 10/1923 | Weigel | |
| 5,042,238 A * | 8/1991 | White, III | B62D 9/00 180/6.24 |
| 5,482,322 A * | 1/1996 | Wheatley | B60G 3/20 180/274 |

(Continued)

FOREIGN PATENT DOCUMENTS

| | | |
|---|---|---|
| DE | 4326668 A1 | 2/1995 |
| DE | 19542496 C1 | 10/1996 |

(Continued)

OTHER PUBLICATIONS

Examination Report dated Jul. 10, 2017 in corresponding German Application No. 10 2016 217 475.4; 24 pages.

(Continued)

*Primary Examiner* — Drew J Brown
(74) *Attorney, Agent, or Firm* — Maier & Maier, PLLC

(57) ABSTRACT

A crash assembly having a crash strut for a wheel of a motor vehicle, which is connected to a tie rod assembly that has at least one tie rod strut. The tie rod strut is connected to a first end of the crash strut via at least one tie rod-side connection module. A second end of the crash strut is connected to a body of the motor vehicle via a body-side connection module.

14 Claims, 4 Drawing Sheets

(56) References Cited

U.S. PATENT DOCUMENTS

| | | | |
|---|---|---|---|
| 2005/0087385 A1* | 4/2005 | Kesselgruber | B62D 7/20 180/415 |
| 2007/0029748 A1* | 2/2007 | Baxter | B62D 7/20 280/86.758 |
| 2017/0015264 A1* | 1/2017 | Mohrlock | B60G 7/02 |

FOREIGN PATENT DOCUMENTS

| | | |
|---|---|---|
| DE | 10113098 A1 | 9/2002 |
| DE | 10032711 C2 | 4/2003 |
| DE | 102009023362 A1 | 12/2010 |
| DE | 102011001508 A1 | 9/2011 |
| DE | 102011120126 A1 | 6/2013 |
| DE | 102011121038 A1 | 6/2013 |
| DE | 102012007889 A1 | 10/2013 |
| DE | 102013203504 A1 | 10/2013 |
| DE | 102014211630 A1 | 12/2015 |
| DE | 102014211631 A1 | 12/2015 |
| DE | 102015106972 A1 | 11/2016 |
| DE | 102015210296 A1 | 12/2016 |
| EP | 1748911 B1 | 8/2008 |
| EP | 1780102 B1 | 1/2009 |
| WO | 2005/037628 A1 | 4/2005 |

OTHER PUBLICATIONS

Search Report and Written Opinion dated Oct. 5, 2017 in corresponding International Application No. PCT/EP2017/069110; 33 pages.

Notification of Transmittal of Translation of the International Preliminary Report on Patentability dated Mar. 28, 2019, in connection with corresponding international Application No. PCT/EP2017/069110 (13 pgs.).

* cited by examiner

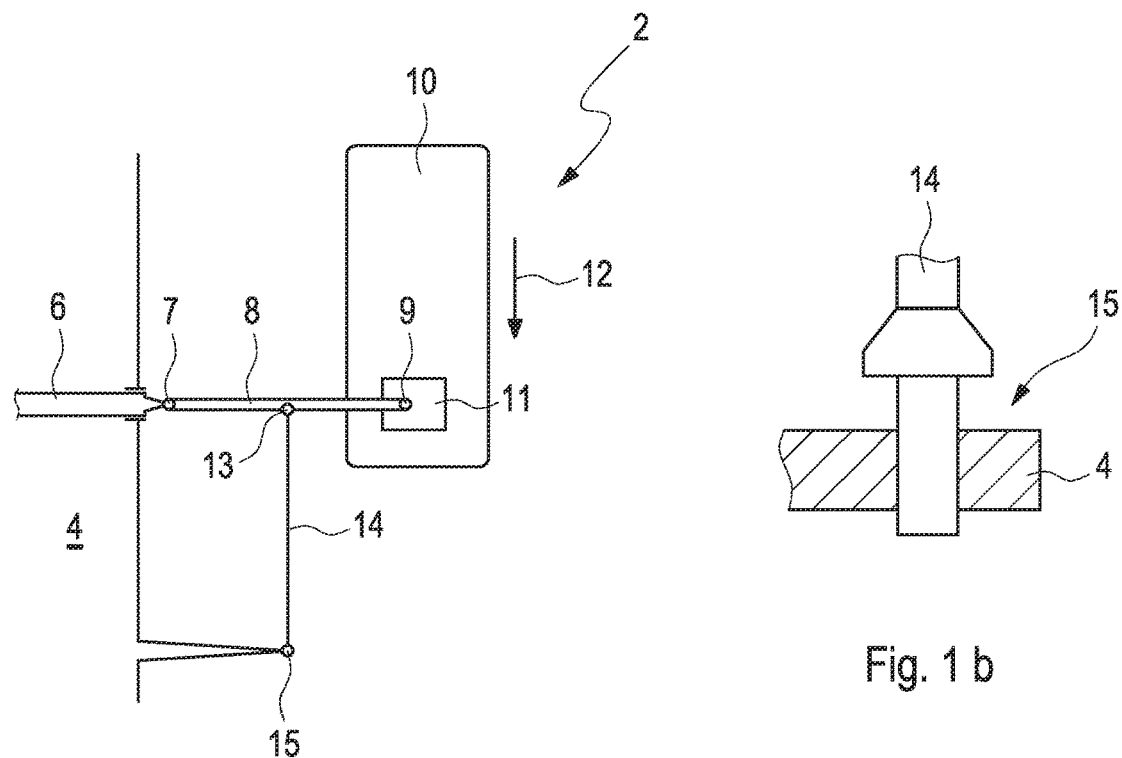
Fig. 1 a
Fig. 1 b
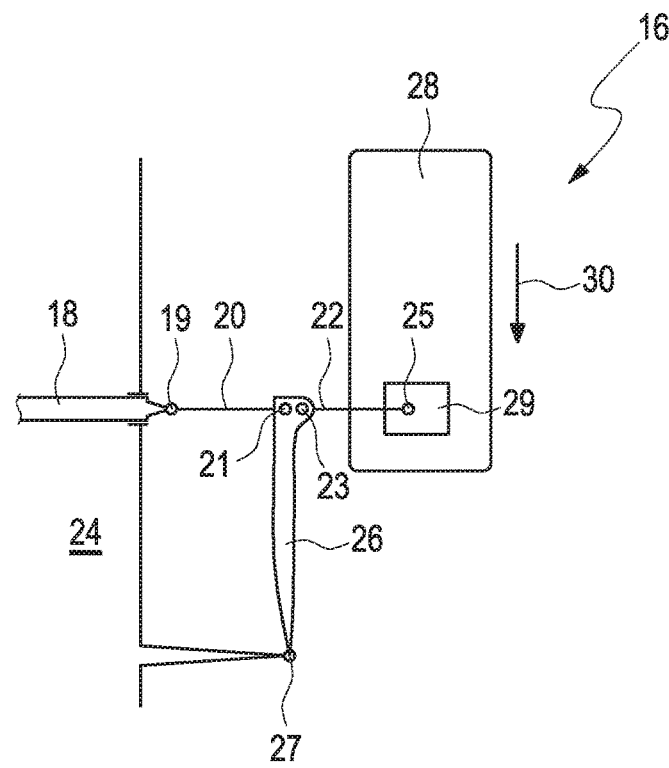
Fig. 2

CRASH ASSEMBLY

FIELD

The invention relates to a crash assembly for a wheel of a motor vehicle.

BACKGROUND

For "small overlap" motor vehicle crashes, wheel suspension measures that are meant to ensure control of the wheel outward as a result of an impact with a crash barrier are known. Such measures are intended to guide the movement of the wheel, in particular of a rim star and a brake disk, as far as possible beyond the motor vehicle, to avoid positive engagement with a rocker panel or even risk to a floor well.

Also known are auxiliary elements fixed to the body in front of the wheel, which in a crash are meant to cause a tire to be struck and/or caught at a favorable position or to cause individual components of the suspension to be severed or bent.

The disadvantage of these measures is that the wheel can be moved to a desired position only very late and to only a limited extent. This desired position may be a toe-in, for example.

In these cases, the goal is to impress a wheel angle or a wheel center offset on the wheel, but this is possible only if a crash barrier is already in contact with the tire. Since the wheel is already forcibly guided by the crash barrier, no significant wheel angle and/or wheel center offset can be impressed upon it. Furthermore, substantial forces are required to sever or bend components of the wheel suspension and to influence wheel guidance following contact with the crash barrier. These forces occur only after an elastic and plastic deformation of rubber bearings, a rod, a hub carrier, and body connection points have been overcome. However, since wheel suspensions are generally resilient in the longitudinal direction for reasons of comfort, this positive engagement does not develop until relatively late.

Moreover, ensuring the robustness of these measures is difficult due to a dependence upon force directions, the deflection, and the steering state of an axle, due to the material quality and material tolerances, e.g., of rubber bearings and of a strut, and due to the slippage of contact surfaces, which is why in most cases no clearly defined position of the wheel can be ensured in the event of a crash.

A tie rod for a motor vehicle, which is composed of at least two telescoping tie rod parts for changing the length of the tie rod, is described in DE 100 32 711 C2. In said case, a propulsive or explosive device actuated by an acceleration sensor is located in the interior of the tie rod, with the explosive effect of said device effecting the change in length of the tie rod.

DE 10 2014 211 631 A1 describes a two-track motor vehicle having a body, a wheel suspension, a hub carrier for rotatably receiving a wheel, a steering system with a tie rod for steering the wheel, and at least one actuating element, wherein in a crash involving deformation of the motor vehicle, the at least one actuating element is meant to deform the tie rod or to displace a steering mechanism of the steering system and thereby to steer the wheel in a targeted manner.

EP 1 748 911 B1 describes a deflector device for a motor vehicle in a partially overlapping frontal collision, the motor vehicle having a front end with a left and a right longitudinal member. The deflector device is arranged in front of a front wheel and protects the front wheel in the event of a collision, with the deflector device forming a kinematic chain which is situated approximately in a horizontal plane.

A front end structure of a motor vehicle having a cross member supporting a steering rack that has an arm at each end articulated to a front wheel of the vehicle is known from EP 1 780 102 B1. In this case, guide means for shifting the rack toward the rear are provided, which act on the arms, thereby enabling the displacement of the rack to be guided along an oblique path which is directed rearward and to the side of the vehicle in relation to the driver's seat, wherein when the vehicle is in a frontal collision, the rear part of a wheel located on the side of a steering column of the vehicle is shifted in a direction away from the vehicle.

SUMMARY

In light of the above, the object is to prevent uncontrolled movement of a wheel in the event of a motor vehicle crash, and to obtain a favorable position of the wheel during a collision.

The crash assembly of the invention comprises a crash strut as at least one component and is intended for a wheel of a motor vehicle which is connected to a tie rod assembly that includes at least one tie rod strut. Said at least one tie rod strut, which can likewise be designed as a component of the crash assembly, is connected to a first end of the crash strut via at least or only one tie rod-side connection module, e.g., at least one tie rod-side bearing position, which may be designed as a tie rod-side bearing point. A second end of the crash strut is connected directly or indirectly to a body of the motor vehicle, e.g., is rotatably attached to the body, via a body-side connection module, e.g., a body-side bearing position or a body-side coupling module.

This makes it possible for the wheel to be steered with the tie rod assembly and for the crash assembly to be provided for a steerable wheel, the rotational axis of which can be turned or pivoted relative to the body of the motor vehicle. However, the crash assembly can also be used for a wheel that is not steered during normal operation of the motor vehicle, and the rotational axis of which is rigidly disposed relative to the body during normal operation.

Alternatively or additionally, the steerable wheel, for example, is connected via the tie rod assembly to a rack of a steering system of the motor vehicle.

The crash assembly is designed to reduce the effects of a crash or accident on the wheel. During such a crash, the motor vehicle collides with a crash barrier and thus with an obstacle that may also impact the wheel, and the movement of the wheel that results from the collision is controlled and/or steered by the crash assembly.

A first variant of the crash assembly is provided for a wheel that is connected to the rack via a tie rod assembly having only one tie rod strut, the one tie rod strut being connected at one end to the rack and at the other end to the wheel. In that case, the crash strut is connected to the body via a body-side connection module and to the one tie rod strut via a tie rod-side connection module. At least one of the two connection modules is designed as a variable-length coupling module. In the first variant, in which the crash strut is connected to the only one tie rod strut via the one connection module, it is possible for a first end of the crash strut to be connected to the one tie rod strut via only one tie rod-side connection module, e.g., one tie rod-side bearing position or one tie rod-side coupling module.

A second and a third variant of the crash assembly are provided for a wheel that is connected to the rack via a tie rod assembly that comprises two tie rod struts. In these variants, a first tie rod strut is connected to the rack and a second tie rod strut is connected to the wheel. The crash strut is connected to the body via a body-side connection module and to at least one of the tie rod struts via at least one tie rod-side connection module. These connection modules are typically designed as bearing positions.

In the second variant it is possible for the first end of the crash strut to be connected to the two tie rod struts via two tie rod-side connection modules. This means that the first end is connected via a first connection module to a first tie rod strut and via a second connection module to a second tie rod strut. The two tie rod struts are connected to one another via the first end of the crash strut.

In the third variant of the crash assembly, the two tie rod struts are connected to one another via a tie rod-connecting bearing position. In that case, the crash strut is connected to only one of the two tie rod struts via a tie rod-side connection module, e.g., a tie rod-side bearing position. The crash strut can then be connected either to the tie rod strut that is connected to the rack or to the tie rod strut that is connected to the wheel. As in the first variant, it is provided in the third variant that the crash strut is connected via a connection module to only one tie rod strut.

In the second variant, however, in which each tie rod strut is connected to the crash strut, it is also possible for the first end of the crash strut to be connected via two tie rod-side connection modules, designed as bearing positions, each to one of the two tie rod struts.

In the second variant, the two tie rod struts may be connected to one another via the first end of the crash strut, in which case each of the two tie rod struts is connected via a tie rod-side connection module, typically a tie rod-side bearing position, to the first end of the crash strut.

Regardless of the number of tie rod struts of the tie rod assembly, the wheel can be steered by means of said assembly relative to the body. A wheel that is not steered during normal operation, the rotational axis of which is rigid relative to the body, may be connected to a one-part tie rod assembly or to a two-part tie rod assembly.

The crash assembly comprises at least one tie rod strut and/or is intended for a tie rod assembly having at least one tie rod strut, with the at least one tie rod strut, e.g., one tie rod strut of two tie rod struts, optionally being designed as a variable-length actuator.

The body-side connection module may be designed as a body-side bearing position, via which the second end of the crash strut is connected directly to the body. This type of body-side bearing position can be provided for a two-part tie rod assembly comprising two tie rod struts.

Alternatively, the body-side connection module may be designed as a coupling module via which the second end of the crash strut is connected indirectly to the body.

Ordinarily, the at least one tie rod-side connection module for a two-part tie rod assembly comprising two tie rod struts is designed as a bearing position.

Alternatively or additionally, the at least one tie rod-side connection module for a two-part tie rod assembly having two tie rod struts is designed as a coupling module.

This type of body-side and/or tie rod-side coupling module may be provided for a one-part tie rod assembly having one tie rod strut. In that case, it is possible for the coupling module to have multiple, e.g. two coupling elements. In a body-side coupling module, a first coupling element is connected to the body and a second coupling element is connected to the second end of the crash strut. In a tie rod-side coupling module, a first coupling element is connected to a tie rod strut and a second coupling element is connected to the first end of the crash strut. The length of the coupling module is then variable, with the coupling module being designed, e.g., as telescoping. In that case, it is possible for the two coupling elements to be designed at least partially as tubes having different diameters. A first of the two tubes, which has a smaller diameter, is then guided in a telescoping fashion within a second of the two tubes, which has a larger diameter.

Generally, the at least one tie rod strut of the tie rod assembly is connected to a hub carrier of the wheel. Depending upon the definition, the hub carrier may be designed and/or characterized as part of the wheel or as a component assigned to the wheel.

In all variants of the crash assembly, it is possible for the at least one tie rod-side connection module to be located between the body-side connection module, i.e., the body-side bearing position or the body-side coupling module, and a rocker panel of the motor vehicle.

The crash assembly can be used for each wheel, and thus both for a wheel that is or can be steered relative to the body and for a wheel that is rigid relative to the body and is not steered. The wheel may be disposed on a generally steerable front axle of the motor vehicle, in which case the body-side connection module, i.e., the body-side bearing position or the body-side coupling module, is located in front of the at least one tie rod-side connection module in a forward direction of travel of the motor vehicle.

However, it is also possible for the crash assembly to be used, for example, for a steerable wheel that is arranged, e.g., on a steerable rear axle of the motor vehicle. In that case, the body-side connection module, i.e., the body-side bearing position or the body-side coupling module, is located behind the at least one tie rod-side connection module in a forward direction of travel of the motor vehicle. The crash assembly is intended for a wheel that is arranged on a front axle. However, the crash assembly may also be used for a wheel on a rear axle.

The crash assembly for the wheel comprises the crash strut, which connects a forward-lying tie rod assembly, or a tie rod assembly lying in front of the wheel in a forward direction of travel, comprising the at least one tie rod strut, to the body. It is possible for the at least one tie rod strut to be connected to the wheel in front of or behind a center of the wheel, typically via a hub carrier. Thus, depending upon the requirements, the front axle or the rear axle may be connected to the crash strut via a tie rod strut located behind or in front of the center of the wheel. In this way, depending upon the requirements, for example in the case of a small overlap crash, a corresponding toe-out steering or toe-in steering of the wheel can be realized, as appropriate.

The tie rod assembly may comprise only one tie rod strut or two tie rod struts. The at least one tie rod strut may also be referred to as a tie rod segment.

The tie rod assembly is connected, directly or indirectly, to the rack via the rack-side bearing position, and to the wheel, e.g. the hub carrier of the wheel, via the wheel-side bearing position, depending upon the definition. If the tie rod assembly comprises only one tie rod strut, said strut is connected, directly or indirectly, to the rack via the rack-side bearing position and to the wheel, e.g., by means of the hub carrier thereof, via the wheel-side bearing position. If the tie rod assembly comprises two tie rod struts, one of the two tie rod struts is connected directly or indirectly to the rack via the rack-side bearing position, and the other of the two tie rod struts is connected directly or indirectly to the wheel, e.g. by means of the hub carrier thereof, via the wheel-side bearing position. The wheel-side bearing position is facing and/or assigned to the wheel. This also includes the possibility of the wheel-side bearing position being connected explicitly to the hub carrier or to some other component of the wheel.

Therefore, the crash strut is attached to the at least one tie rod strut as an additional element, which is mounted on the at least one tie rod strut, i.e., one tie rod strut or two tie rod struts, via at least one tie rod-side connection module, i.e., one tie rod-side bearing position or one tie rod-side coupling module or two tie rod-side bearing positions, and is connected to the tie rod assembly. The crash strut is attached to the body or connected to the body, pointing forward in the forward direction of travel, by the at least one tie rod strut via the body-side connection module, i.e., either via the body-side bearing position, e.g., a body-side bearing point, or via the body-side coupling module.

In the event of a crash, the crash strut first causes the body-side connection module, e.g., the body-side bearing position or the body-side coupling module, to be shifted rearward for a wheel on the front axle or forward for a wheel on the rear axle. This causes the crash strut to press against the at least one tie rod strut of the tie rod assembly, decreasing the distance between the rack-side bearing position and the wheel-side bearing position, the rack-side bearing position, e.g., a rack-side bearing point, being located between the rack and the at least one tie rod strut.

The wheel-side bearing position, e.g., a wheel-side bearing point, is located between the at least one tie rod strut and, e.g., a hub carrier of the wheel. As a result, if the wheel is located on the front axle and the at least one tie rod strut is located in front of the center of the wheel, the wheel is steered in the toe-in direction. Although in such a toe-in position, in the event of a crash the wheel is struck by the crash barrier, it is pushed by the crash assembly even further rearward toward a rocker panel of the motor vehicle.

The crash barrier may be a hard test block or object involved in a collision, e.g. a tree or the corner of a house, which collides with the motor vehicle in the event of a crash. In a small overlap crash, the crash barrier strikes the motor vehicle with a small overlap, and energy generated by the crash is absorbed by the crash assembly since no primary energy absorber, such as a longitudinal member, is impacted in a small overlap crash. In such a crash, the motor vehicle strikes the crash barrier and deforms. In terms of configuration, first a front-end module of the motor vehicle deforms, for example a front-end module of the vehicle body. After that, the crash strut and/or the body-side connection module come into contact with the crash barrier. At that point, the crash strut bends the at least one tie rod strut, i.e., one tie rod strut or two tie rod struts, thereby moving the wheel in a steering motion before the wheel hits the crash barrier.

Alternatively, if the wheel is arranged on the rear axle and the at least one tie rod strut is located behind the center of the wheel, it is possible for the wheel to be steered in a toe-out direction. In such a toe-out position, the wheel is struck by the crash assembly and is pushed further forward toward the rocker panel of the motor vehicle, causing the wheel to be rotated in a toe-out direction.

This results in a very early effect, even before the crash barrier comes in contact with the wheel and with a tire that is mounted on the wheel, with this effect being reduced by the crash assembly. It also results in a robust preconditioning of the axle on which the wheel is suspended, defined by guided kinematics and a clear transmission of force. The rack and the steering wheel are impacted only slightly or not at all. In addition, maximum wheel angles can be achieved, thereby preventing any positive engagement with the rocker panel. The crash assembly is also robust in terms of its deflection and steering state, in terms of different overlap ratios and overlap angles of the crash assembly, and in terms of the ambient temperature, in crashes that are outside of standard conditions. With the crash assembly, the effects of all frontal crashes or frontal accidents in which the wheel is impacted, e.g. small overlap crashes, can be reduced.

In terms of configuration, the crash assembly comprises at least one tie rod-side connection module, i.e., the first tie rod-side bearing position or one tie rod-side coupling module, and therefore optionally also the two tie rod-side bearing positions, which is or are located about at the center of the tie rod assembly, i.e., about at the center of only one tie rod strut or between two tie rod struts, along with the body-side connection module, e.g., the body-side bearing position or the body-side coupling module, which is situated approximately the same distance from a center axis of the motor vehicle oriented in the forward travel direction as the at least one tie rod-side connection module that may be designed as a bearing position or as a coupling module, and which is located a significant distance in front of the at least one tie rod-side connection module in the forward travel direction.

If the tie rod assembly is configured as one-part and comprises only one tie rod strut, the second end of the crash strut can be connected to the body via the variable-length body-side connection module, designed as a coupling module. In that case, a first coupling element of the coupling module is connected to the second end of the crash strut and the body is connected to a second coupling element of the coupling module. The two coupling elements are displaceable relative to one another, enabling a length adjustment to be achieved by means of the coupling module between the crash strut and the body. In that case, the crash strut is connected indirectly to the body. The crash strut and the body can also be decoupled via the coupling module. When the crash assembly is deployed, a flow of a force that may result from an impact with the crash barrier in the event of a crash is transmitted by the crash strut. This force acts not on the wheel but on the at least one tie rod strut, with the force acting only on the one tie rod strut of a one-part tie rod assembly or on the at least one tie rod strut of a two-part tie rod assembly, e.g., on one tie rod strut or on both tie rod struts. The at least one tie rod strut may then buckle, applying a different force to the wheel.

In one exemplary embodiment, the coupling module comprises the two coupling elements and is configured as a two-part module, with the coupling elements being displaceable relative to one another as in a telescope. In that case, the two coupling elements are configured, e.g., as tubes having different diameters, with the coupling element that has the smaller diameter being arranged displaceably or telescopically in the coupling element that has the larger diameter. With this variable-length coupling module, the distance between the body, on which one of the two coupling elements is arranged, and the second end of the crash strut, on which the other of the two coupling elements is arranged, can be adjusted; such a distance may occur during steering and damping of the axle on which the wheel is arranged. In a crash, the telescopic coupling module is collapsed until the two mutually displaceable coupling elements reach a stop. In the collapsed state, the coupling module is at its minimum length and can conduct a force from the crash strut to the tie rod strut. It is further possible for the crash strut to be configured, e.g. as having a variable length, so that the force flows into the first end of the crash strut and/or into the tie rod-side bearing position located thereon, in which case only the tie rod-side end of the crash strut is involved in such a flow of force, whereas the telescoping coupling module itself is not.

Alternatively, a coupling module, e.g., a body-side coupling module and/or optionally at least one tie rod-side coupling module, may also be configured as a one-part component. This one-part coupling module has a defined axis of rotation and is mounted so as to rotate on the body, relative to the body and/or with respect to the body along the defined axis of rotation. This coupling module likewise comprises two coupling elements, e.g., two bearing positions, with a first coupling element being arranged on the body and a second coupling element being arranged on the crash strut. This one-part coupling module connects the crash strut to the body and is preferably arranged such that in a crash, it is not within the flow of force between the crash barrier and crash strut.

In one possible embodiment, it is also conceivable for a crash strut, the first end of which is connected to a two-part tie rod assembly via at least one tie rod strut, to be connected to the body by a connection module that may be configured as a variable-length, e.g. telescopic coupling module, rather than via a bearing position.

The crash assembly can be used for different wheel suspensions and axles. This refers, for example, to an axle designed as a front axle with a steering system or steering arranged in front of a center of the wheel in the forward direction of travel. A steering system behind the center of the wheel will lead to a shortening of the tie rod assembly, generally of the at least one tie rod strut, and thus to a toe-out angle. In addition, the crash assembly can be used for a steered or a non-steered rear axle. For an axle designed as a rear axle, a rear crash is the relevant crash case, wherein the body-side connection module, i.e., the body-side bearing position or the body-side coupling module, is located a significant distance behind the at least one tie rod-side connection module in the forward direction of travel.

Further advantages and embodiments of the invention will be apparent from the description and the accompanying drawings.

It is understood that the features mentioned above and those yet to be explained below may be employed not only in the combination specified in each case, but also in other combinations or alone, without departing from the scope of the present invention.

BRIEF DESCRIPTION OF THE DRAWINGS

The invention is illustrated schematically in the set of drawings in the context of embodiments, and will be described schematically and in detail with reference to the drawings.

FIG. 1a shows a schematic representation of a first embodiment of the crash assembly of the invention.

FIG. 1b shows another schematic representation of a first embodiment of the crash assembly of the invention.

FIG. 2 shows a schematic representation of a second embodiment of the crash assembly of the invention.

The figures will be described coherently and comprehensively. Like components are assigned the same reference numerals.

DETAILED DESCRIPTION

Figure 3:
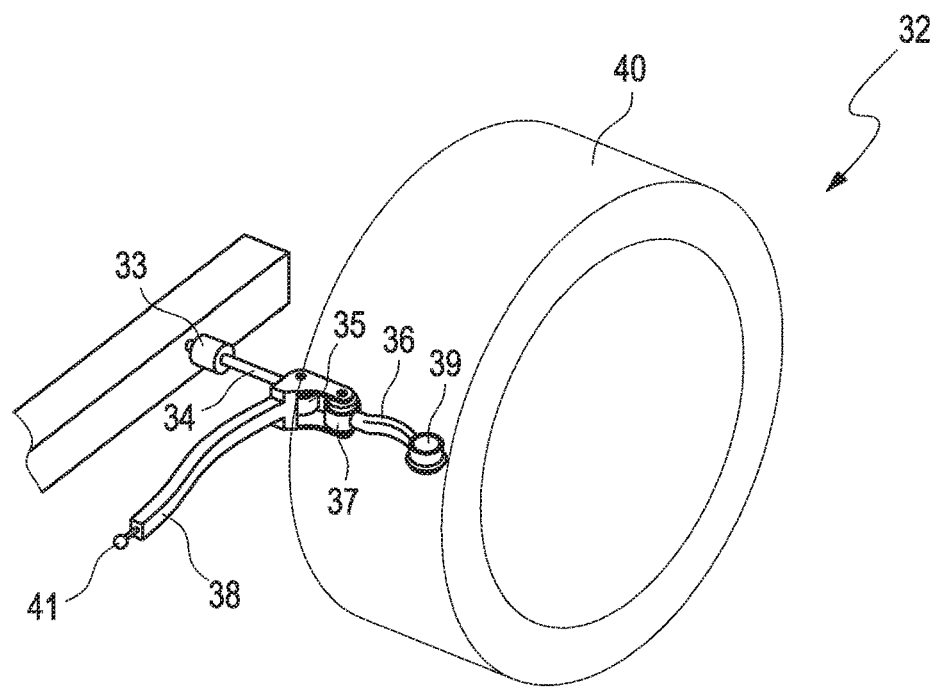
FIG. 3 shows a schematic representation of a third embodiment of the crash assembly of the invention.

The first embodiment of the crash assembly 2 is shown schematically in FIG. 1a, with FIG. 1b showing a detail from FIG. 1a. This first embodiment may also be referred to as a first variant of the crash assembly. FIG. 1a shows part of a body 4 of a motor vehicle, a rack 6, and a tie rod strut 8 or tie rod segment of an integral tie rod assembly of a steering system of the motor vehicle, along with a wheel 10 of the motor vehicle, with a hub carrier 11 being assigned to the wheel 10. The rack 6 is connected to a first end of the tie rod strut 8 via a rack-side bearing position 7. The wheel 10, here the hub carrier 11 of the wheel 10, is connected to a second end of the tie rod strut 8 via a wheel-side bearing position 9. In FIG. 1a, an arrow 12 indicates a forward direction of travel of the motor vehicle, making the wheel in FIG. 1 a left, front wheel 10.

Also provided here along the tie rod strut 8, approximately at the center of the tie rod strut 8, is a tie rod-side connection module, here a tie rod-side bearing position 13, via which a first end of a crash strut 14 is connected to the tie rod strut 8. A second end of the crash strut 14 is connected to the body 4 via a body-side connection module, here via an adjustable-length body-side coupling module 15. The body-side coupling module 15 is located in front of the tie rod-side bearing position 13 in the forward direction of travel. The tie rod-side bearing position 13 and the body-side coupling module 15 at the ends of the crash strut 14 are located approximately the same distance from the center axis of the motor vehicle oriented parallel to the forward direction of travel.

FIG. 1b shows a detail of a mounting of the second end of the crash strut 14 on the body 4 by means of the connection module, which is designed as a body-side coupling module 15. With this length-adjustable coupling module 15, a length adjustment is achieved in a longitudinal direction of the motor vehicle between the body 4 and the crash strut 14 and/or the tie rod strut 8, because the crash strut 14 is moved with steering and damping of the wheel 10.

The length adjustment is indicated schematically in FIG. 1b, in which the coupling module is rotatable and telescopic. The coupling module 15 comprises two coupling elements that are displaceable relative to one another, a first coupling element being connected to the body 4 and a second coupling element being connected to the crash strut 14. In the event of a crash, a resulting force flows into the crash strut 14, for example into the first end of the crash strut 14. Said force does not flow into the coupling module 15. This type of length adjustment can also be achieved by means of the tie rod-side connection module if said module is designed as a length-adjustable coupling module rather than as a tie rod-side bearing position 13.

The second embodiment of the crash assembly 16, illustrated schematically in FIG. 2, is provided for a steering system which, in addition to a rack 18, comprises a first tie rod strut 20 and a second tie rod strut 22, which, depending upon the definition, may also be designed and/or referred to as a two-part tie rod assembly comprising two tie rod struts 20, 22 or tie rod segments, as compared with the integral tie rod strut 8 of FIG. 1.

FIG. 2 also shows part of a body 24 of a motor vehicle. In this case, the rack 18 is connected via a rack-side bearing position 19 to a first end of the first tie rod strut 20. At a second end of the first tie rod strut 20, a first tie rod-side bearing position 21 is located as a first tie rod-side connection module, via which the first tie rod strut 20 is connected to a first end of a crash strut 26. Also located at the first end of the crash strut 26 is a second tie rod-side bearing position 23 as a second tie rod-side connection module, via which the crash strut 26 is connected to a first end of the second tie rod strut 22, while a second end of the second tie rod strut 22 is connected via a wheel-side bearing position 25 by means of a hub carrier 29 to a wheel 28 of the motor vehicle. In this case, the wheel 28 is connected to the wheel-side bearing position 25 indirectly by means of the hub carrier 29.

The two tie rod struts 20, 22 are thereby connected to one another via the first end of the crash strut 26. A second end of the crash strut 26 is connected to the body 24 via a body-side bearing position 27 as a body-side connection module. In this case, the body-side bearing position 27 is located in front of the two tie rod-side bearing positions 21, 23 in a forward direction of travel (arrow 30) of the motor vehicle.

The third embodiment of the crash assembly 32, shown schematically in FIG. 3, is provided, as in the case of the second embodiment, for a steering system of a motor vehicle having a tie rod assembly which is designed as two-part and/or referred to as two-part, depending upon the definition, and which comprises two tie rod struts 34, 36 or tie rod segments. In detail, FIG. 3 shows a rack-side bearing position 33, via which a first end of a first tie rod strut 34 is connected to a rack of the steering system (not shown). A second end of the first tie rod strut 34 is connected to a first end of a crash strut 38 via a first tie rod-side bearing position 35 as a first tie rod-side connection module. Also located at the first end of the crash strut 38 is a second tie rod-side bearing position 37 as a second tie rod-side connection module, via which the crash strut 38 is connected to a first end of the second tie rod strut 36. The two tie rod struts 34, 36 or tie rod segments are thus connected to one another via the first end of the crash strut 38. A second end of the second tie rod strut 36 is connected via a wheel-side bearing position 39 to a wheel 40 of the motor vehicle.

A second end of the crash strut 38 is connected to a body of the motor vehicle (not shown here) via a body-side bearing position 41 as a body-side connection module. Here again, the body-side bearing position 41 is located in front of the two tie rod-side bearing positions 35, 37 in a forward direction of travel of the motor vehicle.

Depending upon the definition, the embodiments depicted in FIGS. 2 and 3 may also be referred to as second variants of the crash assembly 16, 32.

Figure 4:
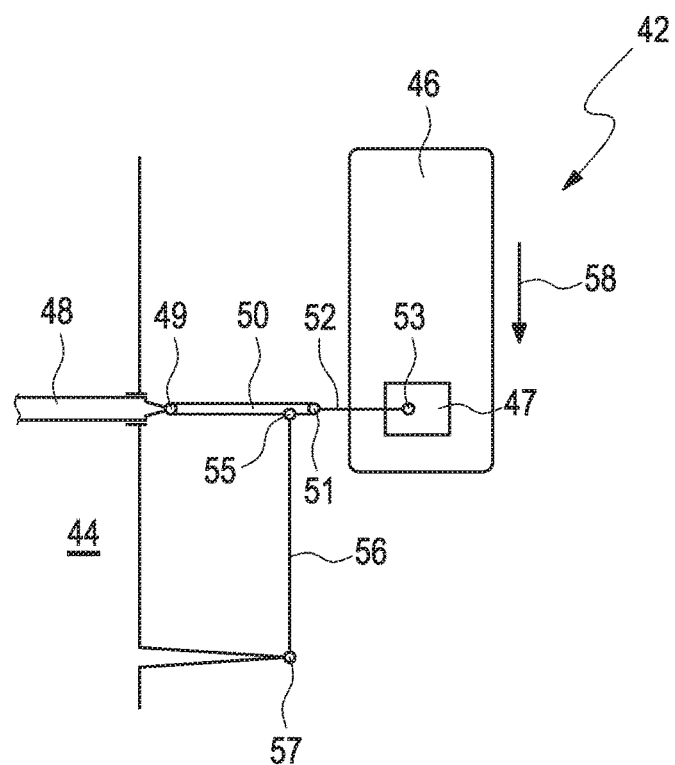
FIG. 4 shows a schematic representation of a fourth embodiment of the crash assembly of the invention.

The fourth embodiment of the crash assembly 42 shown schematically in FIG. 4 is provided for a motor vehicle which has a body 44, a wheel 46, and a steering system with a two-part tie rod assembly. A hub carrier 47 is also assigned to the wheel 46. This steering system comprises a rack 48, a first tie rod strut 50, and a second tie rod strut 52 of the two-part tie rod assembly. In this case, the rack 48 is connected via a rack-side bearing position 49 to a first end of the first tie rod strut 50. A second end of the first tie rod strut 50 is connected to a first end of the second tie rod strut 52 via a tie rod-connecting bearing position 51. A second end of the second tie rod strut 52 is connected via a wheel-side bearing position 53 by means of the hub carrier 47 to the wheel 46.

Also provided here along the first tie rod strut 50, in this case approximately between the center of the first tie rod strut 50 and the second end thereof or the tie rod-connecting bearing position 51, is a tie rod-side bearing position 55 as a tie rod-side connection module, which connects the first tie rod strut 50 to a first end of a crash strut 56. Alternatively, the tie rod-side bearing position 55 and thus the tie rod-side connection module may also be located on the second tie rod strut 52. A second end of the crash strut 56 is connected to the body 44 via a body-side bearing position 57 as a body-side connection module. Said body-side bearing position 57 is located in front of the tie rod-side bearing position 55 in the forward direction of travel (arrow 58) of the motor vehicle.

The fifth embodiment of the crash assembly 60, depicted schematically in FIGS. 5a to 5f, is provided for a motor vehicle having a body (not shown here), a wheel 62, and a steering system with a two-part tie rod assembly. This steering system comprises a rack (not shown here), a first tie rod strut 64, which may also be referred to as a first tie rod segment, and a second tie rod strut 66, which may also be referred to as a second tie rod segment, of the two-part tie rod assembly.

The rack is connected via a rack-side bearing position 63 to a first end of the first tie rod strut 64. A second end of the first tie rod strut 64 is connected to a first end of the second tie rod strut 66 via a tie rod-connecting bearing position 65. A second end of the second tie rod strut 66 is connected to the wheel 62 via a wheel-side bearing position 67.

Also provided here along the first tie rod strut 64, in this case approximately between the center of the first tie rod strut 64 and the second end thereof or the tie rod-connecting bearing position 65, is a tie rod-side bearing position 69 as a tie rod-side connection module, which connects the first tie rod strut 64 to a first end of a crash strut 70. A second end of the crash strut 70 is connected to the body via a body-side bearing position 71 as a tie rod-side connection module.

Figure 5A:
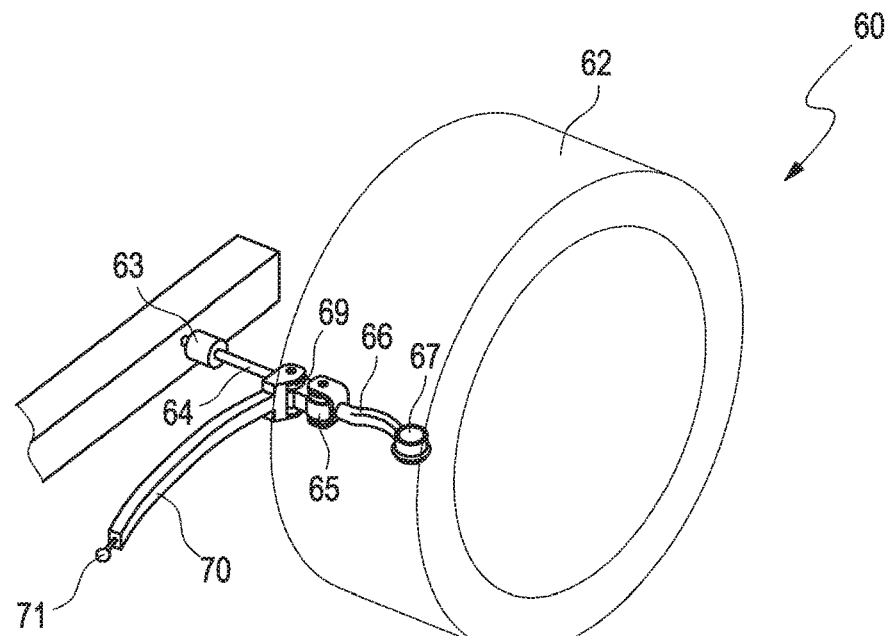
FIG. 5a shows a schematic representation of a fifth embodiment of the crash assembly of the invention.
Figure 5B:
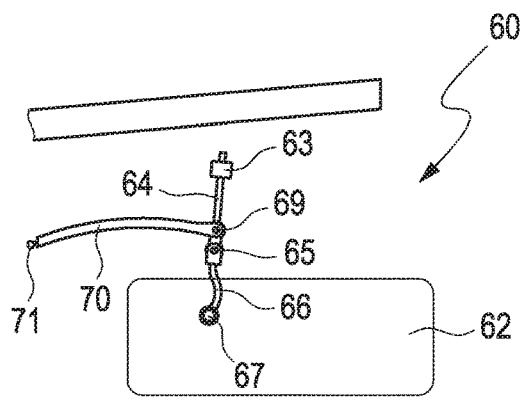
FIG. 5b shows another schematic representation of a fifth embodiment of the crash assembly of the invention.
Figure 5C:
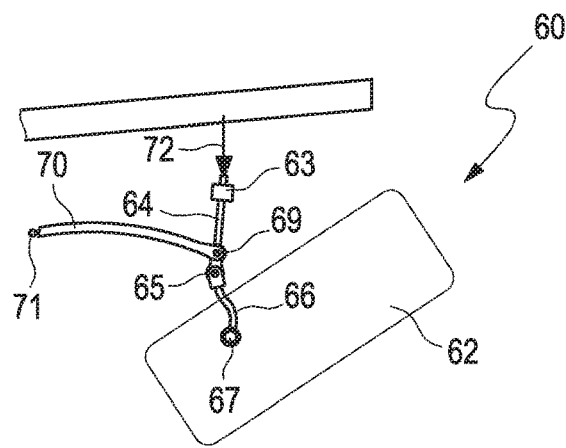
FIG. 5c shows another schematic representation of a fifth embodiment of the crash assembly of the invention.
Figure 5D:
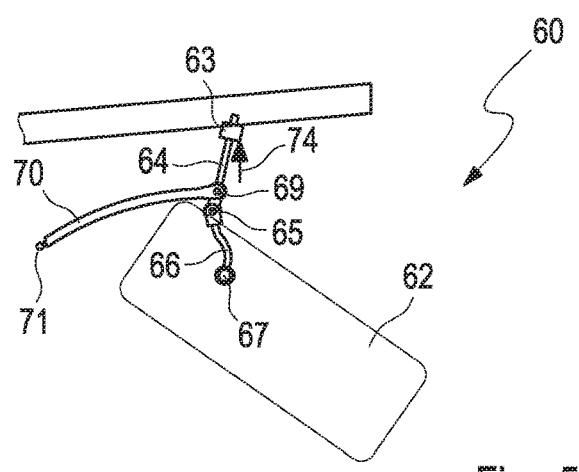
FIG. 5d shows another schematic representation of a fifth embodiment of the crash assembly of the invention.

FIG. 5b shows a plan view of the crash assembly 60 in an operating position designed as the normal position. FIG. 5c shows the crash assembly 60 in a first operating position designed as the steering position of the wheel 62 with an inner steering angle, in which the rack is moved toward the wheel 62 in the direction of an arrow 72. In contrast, in a second operating position formed as the steering position with an outer steering angle, as shown in FIG. 5d, the rack is moved away from the wheel 62 in the direction of an arrow 74. In all three operating positions depicted in FIGS. 5b to 5d, the body-side bearing position 71 at the second end of the crash strut 70 has a fixed, unshifted and therefore unchanged position.

FIG. 5e shows a plan view of the crash assembly 60, likewise in the operating position designed as the normal position. FIGS. 5f and 5g show the crash assembly 60 in a position occurring in the event of a crash. In a crash, the crash strut pushes or pulls the body-side bearing position 71 toward the rear, with the body-side bearing position 71 at the second end of the crash strut 70 being displaced by about 50 mm in FIG. 5f (arrow 76) and by about 100 mm in FIG. 5g (arrow 78). In the event of a crash, the tie rod assembly is buckled by the crash strut 70, and a wheel angle is impressed on the wheel 62 without moving the rack and even before a crash barrier collides with the wheel 62. It is possible for the two tie rod struts 64, 66 to be folded against one another with a buckling of the tie rod assembly.

Figure 5:
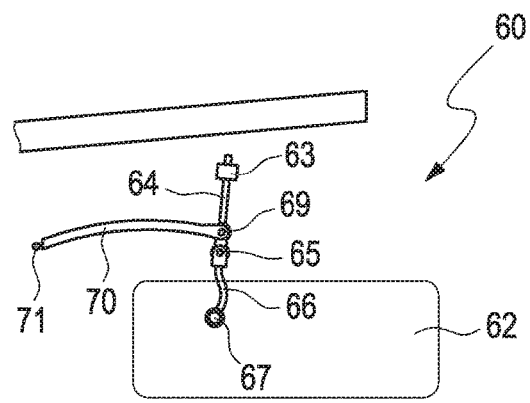
FIG. 5e shows another schematic representation of a fifth embodiment of the crash assembly of the invention.
FIG. 5f shows another schematic representation of a fifth embodiment of the crash assembly of the invention.
FIG. 5g shows another schematic representation of a fifth embodiment of the crash assembly of the invention.
Figure 5:
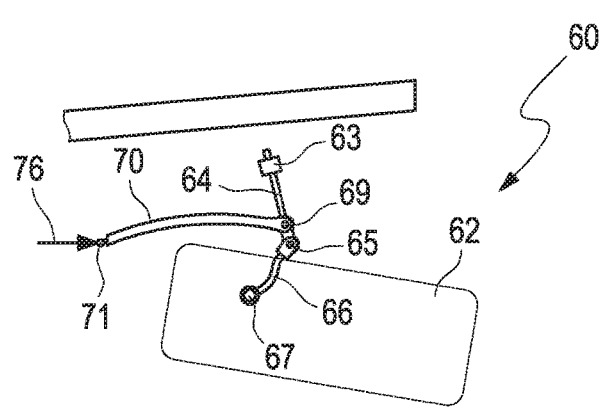
Figure 5:
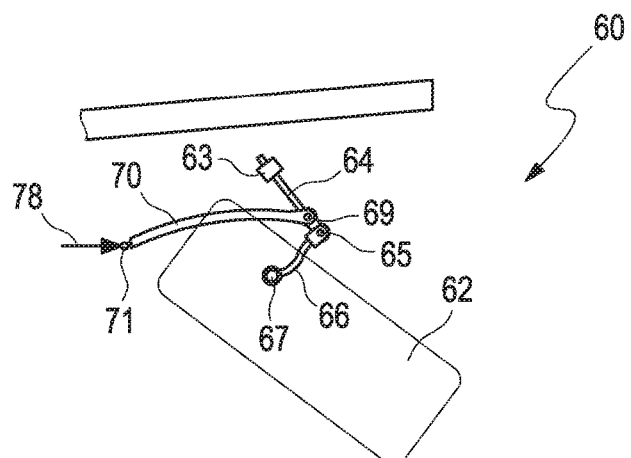

Depending upon the definition, the embodiments depicted in FIGS. 4 and 5 may also be referred to as third variants of the crash assembly 42, 60.

At least one bearing position 13, 21, 23, 27, 35, 41, 55, 57, 69, 71, i.e., at least one tie rod-side bearing position 13, 21, 35, 55, 69 or the body-side bearing position 27, 41, 57, 71, each as possible connection modules at one end of the crash strut 14, 26, 38, 56, 70 of a depicted embodiment of the crash assembly 2, 16, 32, 42, 60, may be designed as a ball joint, e.g. an axial ball joint, a plain bearing, a rolling bearing, or a rubber-metal bearing. Depending upon the embodiment of the crash assembly 2, 16, 32, 42, 60, a bearing position 13, 21, 23, 27, 35, 41, 55, 57, 69, 71 as a connection module may have an adjustable rigidity and an adjustable bearing path, which are designed differently according to the requirements. If a connection module, for example in the first variant of the crash assembly 2, is designed as a coupling module 15, its length can be variable.

In the first embodiment or the first variant of the crash assembly 2, in which at the first end of the crash strut 14 only one tie rod-side connection module, e.g., one tie-rod side bearing position 13, is provided, at least one of the two connection modules, and optionally both connection modules at the two ends of the crash strut 14 is/are designed as a coupling module 15 that has a variable and adjustable length, and thus a variable bearing path. In that case, a relative movement between the first end of the crash strut 14 and the one tie rod strut 8 can be enabled by a first bearing path of the tie rod-side connection module. A second bearing path of the body-side connection module, i.e., of a body-side bearing position or of the body-side connection module 15, enables a relative movement between the second end of the crash strut 14 and the body 4, thereby compensating for displacement during damping and steering.

In the fourth and fifth embodiments or the third variant of the crash assembly 42, 60, in each of which a tie rod-side connection module, e.g., a tie rod-side bearing position 55, 69, is located at the first end of the crash strut 55, 70, the tie rod-side connection module is designed as a tie rod-side bearing position 55, 69 and the body-side connection module is designed as a body-side bearing position 57, 71. In that case, the crash strut 55, 70 is firmly braced at one end against the first tie rod strut 50, 64 via the tie rod-side bearing position 55, 69 and at the other end against the body 44 via the body-side bearing position 57, 71, or is firmly fixed between the first tie rod strut 50, 64 and the body 44.

Furthermore, in the fourth and fifth embodiments or the third variant of the crash assembly 42, 60 is it provided that the first end of the crash strut 56, 70 is connected or fastened to only one of the two tie rod struts 50, 52, 64, 66, in this case the first tie rod strut 50, 52, which is also connected via a rack-side bearing position 49, 63 to the rack 48.

In the second and third embodiments or the second variant of the crash assembly 16, 32, in each of which two tie rod-side bearing positions 21, 23, 35, 37 are provided as connection modules at the first end of the crash strut 26, 38, connecting the crash strut 26, 38 to two tie rod struts 20, 22, 50, 52, wherein the two tie rod struts 20, 22, 50, 52 are connected via the first end of the crash strut 26, 38, a high cardanic force is provided for the tie rod-side bearing positions 21, 23, 35, 37, thus providing high rigidity for the bearing positions 21, 23, 35, 37 located in the flow of force along the two tie rod struts 20, 22, 50, 52 or tie rod segments, thereby preventing the tie rod-side bearing positions 21, 23, 35, 37 from "dropping".

In the first embodiment or variant of the crash assembly 2 (FIG. 1a, 1b), in which the tie rod assembly comprises only one tie rod strut 8 or one tie rod segment, it follows that the one tie rod strut 8 has little to no losses with respect to rigidity as compared with a customary design of a motor vehicle axle. Moreover, steering kinematics are unchanged or the same. In this first embodiment, the tie rod strut 8 may also have or be provided with a predetermined bending point, in order to keep forces for bending the tie rod strut 8 low. However, the predetermined bending point prevents a breaking of the tie rod strut 8, in contrast to a predetermined breaking point.

In the second and third embodiments, and thus in the second variant of the crash assembly 16, 32, in the event of a crash, a relatively small force is required to shorten at least one of the two tie rod struts 20, 22, 34, 36, e.g., the first or possibly the second tie rod strut 20, 34, and thus to rotate the wheel 28, 40. This means that the rack 18 is not acted upon by the two tie rod struts 20, 22, 34, 36, typically by the first tie rod strut 20, 34 of the tie rod assembly, with the result that a steering wheel of the motor vehicle, which is connected to the rack 18, also is not or is barely acted upon, thereby increasing the protection afforded to passengers.

In addition, in the second and third embodiments or the second variant of the crash assembly 16, 32, as compared with the first embodiment and thus the first variant of the crash assembly 2, there is no risk of uncontrolled component bending, and as a result, the safe guidance of the wheel 40 into a desired position is guaranteed.

In the fourth and fifth embodiments or the third variant of the crash assembly 42, 60, as compared with the second and third embodiments and thus the second variant of the crash assembly 16, 32, only one tie rod-side bearing position 55, 69 is located in a flow of force along the tie rod assembly, i.e., along at least one tie rod strut 50, 52, 64, 66, typically the first tie rod strut 50, 64. It is therefore possible for at least one of the two tie rod struts 50, 52, 64, 66, typically the first tie rod strut 50, 64, to be more rigid than at least one of the tie rod struts 20, 22, 34, 36 of the second or third embodiment of the crash assembly 16, 32, enabling the steering system of a motor vehicle equipped with the crash assembly 42, 60 to react more directly and/or more quickly to a steering command or a steering response.

The at least one tie rod-side connection module or the at least one tie rod-side bearing position 13, 21, 23, 35, 37, 50, 51, 69 and/or the crash strut 14, 26, 38, 56, 70 may also be configured such that, for example, additional elements of a wheel suspension of the wheel 10, 28, 40, 46, 62 of the motor vehicle are selectively separated and/or brought into collision. For instance, a damper strut, a joint shaft, or a rim of the wheel 10, 28, 40, 46, 62 may be acted upon by the at least one tie rod-side bearing position 13, 21, 23, 35, 37, 50, 51, 69.

In at least the second, third, fourth, and fifth embodiments and thus in the second and third variants of the crash assembly 16, 32, 42, 60, it is possible for at least one bearing position 19, 21, 23, 25, 33, 35, 37, 39, 49, 51, 53, 55, 63, 65, 67, 69 to be formed on at least one tie rod strut 20, 22, 34, 36, 50, 52, 64, 66 or on at least one tie rod segment of a respective two-part tie rod assembly as a rubber-metal bearing or as a double-shear joint rather than as a ball joint.

The crash strut 14, 26, 38, 56, 70 of each crash assembly 2, 16, 32, 42, 60 is able to move freely under normal operating conditions, e.g., during damping and steering. In addition, in the second, third, fourth, and fifth embodiments of the crash assembly 16, 32, 42, 60, each of which has a two-part tie rod assembly, a toe-in curve, an Ackermann steering angle, and a steering ratio can be adapted and/or reconfigured accordingly.

Furthermore, with regard to positions of the bearing positions 19, 21, 23, 25, 33, 35, 37, 39, 49, 51, 53, 55, 63, 65, 67, 69, inter alia, new degrees of freedom are available.

In the first embodiment or variant of the crash assembly 2, the body-side coupling module 15 as a connection module may be located even closer to the body 4 than is shown in the diagram of FIG. 1*b*, and is typically positioned a shorter distance from the center axis of the motor vehicle than the connection module embodied as tie rod-side bearing position 13. It is alternatively possible, however, for the body-side coupling module 15 to be located a greater distance from the body 4 than is shown in FIG. 1*a*, so that a flow of force can be closed by way of the crash strut 14.

The invention claimed is:

1. A crash assembly, comprising:
a crash strut for a wheel of a motor vehicle, which
wherein the wheel is connected to a tie rod assembly that has at least one tie rod strut,
wherein the at least one tie rod strut is connected to a first end of the crash strut via at least one tie rod-side connection module, and wherein a second end of the crash strut is connected to a body of the motor vehicle via a body-side connection module,
wherein at least one of the at least one tie rod-side connection module and the body-side connection module are designed as a two-part module,
wherein each two-part module comprises two parts which are displaceable relative to one another in a telescoping fashion so that the crash strut creates a force path between the body of the motor vehicle and the tie rod assembly only when the two-part module collapses to a minimum length.

2. The crash assembly according to claim 1, wherein the first end of the crash strut is connected to the at least one tie rod strut via exactly one tie rod-side connection module.

3. The crash assembly according to claim 1, wherein the first end of the crash strut is connected to the at least one tie rod strut via exactly two tie rod-side connection modules.

4. The crash assembly according to claim 1, wherein the tie rod assembly has exactly one tie rod strut, wherein the one tie rod strut is connected at one end to a rack and at the other end to the wheel.

5. The crash assembly according to claim 1, wherein the tie rod assembly has exactly two tie rod struts, wherein a first tie rod strut is connected to a rack and a second tie rod strut is connected to the wheel.

6. The crash assembly according to claim 5, wherein the two tie rod struts are connected to one another via a tie rod-connecting bearing position, wherein the crash strut is connected via a tie rod-side connection module to only one of the two tie rod struts.

7. The crash assembly according to claim 5, wherein the two tie rod struts are connected to one another via the first end of the crash strut, wherein each one of the two tie rod struts is connected via a tie rod-side connection module to the first end of the crash strut.

8. The crash assembly according to claim 1, wherein the at least one tie rod strut is designed as a variable-length actuator.

9. The crash assembly according to claim 1, wherein the body-side connection module is designed as a bearing position.

10. The crash assembly according to claim 1, wherein the at least one tie rod-side connection module is designed as a bearing position.

11. The crash assembly according to claim 1, wherein the at least one tie rod strut of the tie rod assembly is connected to a hub carrier of the wheel.

12. The crash assembly according to claim 1, wherein the at least one tie rod-side connection module is located between the body-side connection module and a rocker panel of the motor vehicle.

13. The crash assembly according to claim 1, wherein the wheel is arranged on a front axle of the motor vehicle, wherein the body-side connection module is located in front of the at least one tie rod-side connection module in a forward direction of travel of the motor vehicle.

14. The crash assembly according to claim 1, wherein the wheel is arranged on a rear axle of the motor vehicle, wherein the body-side connection module is located behind the at least one tie rod-side connection module in a forward direction of travel of the motor vehicle.

* * * * *